UNITED STATES PATENT OFFICE.

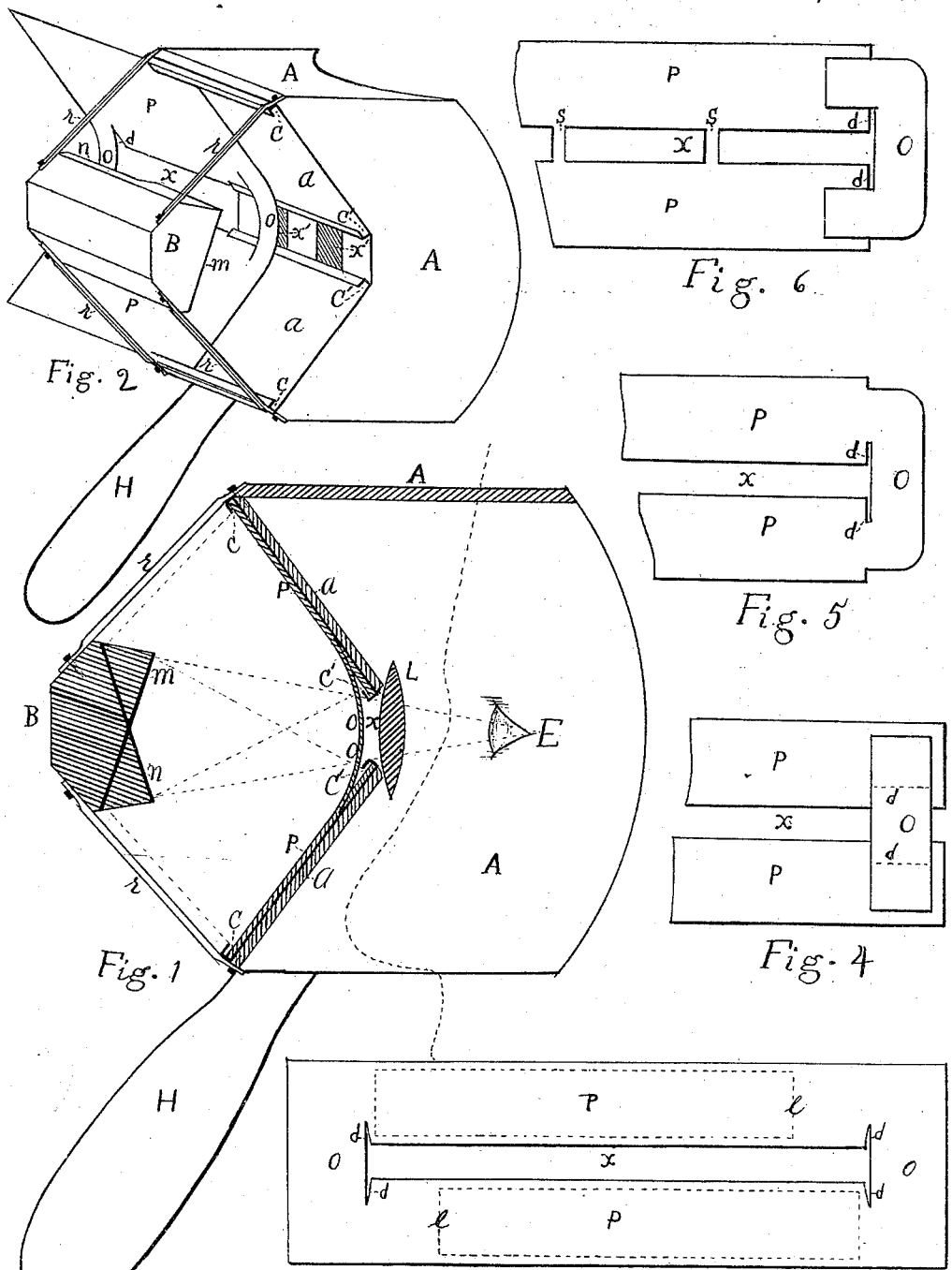

AARON K. TUTTLE, OF ST. LAWRENCE, NEW YORK.

REFLECTING STEREOSCOPE.

SPECIFICATION forming part of Letters Patent No. 313,899, dated March 17, 1885.

Application filed March 26, 1884. (No model.)

*To all whom it may concern:*

Be it known that I, AARON K. TUTTLE, a citizen of the United States, residing at St. Lawrence, in the county of Jefferson and State of New York, have invented certain new and useful Improvements in Reflecting Stereoscopes; and I do hereby declare that the following is a full, clear, and exact description of the invention, which will enable others skilled in the art to which it appertains to make and use the same, reference being had to the drawings accompanying and forming a part of this specification.

This invention relates to that class of stereoscopes in which, by the employment of mirrors situated in different planes, the two pictures of the stereoscopic pair, which are placed one above the other, are reflected to the eyes in a proper manner for observation. The position of the two pictures allows them to be of any width, and it is the special design of this improved stereoscope to show pictures of any width desired by means of sliding picture-mounts, which slide from side to side in grooves in the picture-rest. That these sliding picture-mounts may not be too large for the position in which they are placed and for convenient handling, the objects in the pictures are taken smaller than in the ordinary stereoscopic picture, but being placed proportionably nearer the eye with glasses of corresponding magnifying power the objects appear as large.

In the drawings, Figure 1 represents in full size a section of this stereoscope in a vertical plane perpendicular to the planes of the mirrors and pictures. Fig. 2 is a general view in perspective, showing a picture-mount introduced at the right side of the picture-rest. Figs. 3, 4, 5, and 6 relate to the construction of the picture-mount.

Where the same part is shown in different figures it is indicated by the same letter.

The part A in Figs. 1 and 2 is the eye shade or hood, similar to that in the common stereoscope. It has attached the front $a\,a$, which has the greater portion of its upper and lower halves inclined toward each other with two small openings, $x'\,x'$, between them. Back of each of these openings $x'$ is an eye-glass, L.

The front $a\,a$, having grooves $c\,c'\,c'\,c$, one along the upper and lower edge of each inclined part, constitutes the picture-rest, the grooves holding the picture-mount against the incline faces of the front $a\,a$, while they allow it to slide from side to side.

Fig. 3 shows the general form of the picture-mount, which, having the narrow opening $x$ through and along its center, may be said to consist of four parts—two sides, $p\,p$, and two ends, $o\,o$. The open lines $e\,e$ indicate the place of the two pictures thereon. These picture-mounts are made of card-board or some thin material, and may be constructed of different pieces, as shown in Fig. 4, where the parts $o\,o$ are attached across the parts $p\,p$. Figs. 5 and 6 show different forms of the parts $o\,o$.

The position of the picture-mount when in the picture-rest is shown by its section $p\,o\,o\,p$, Fig. 1, parts $p\,p$ being in planes resting against the inclined faces of the front $a\,a$, with the upper and lower edge of each respectively in the grooves $c\,c'\,c'\,c$, while the parts $o\,o$ are bent in a circular form. This bending of the parts $o\,o$ inclines the parts $p\,p$, and owing to the slit or space $d$ throws their edges at the opening $x$ back of the parts $o\,o$, so that they enter the grooves $c'\,c'$ at that place. This position of the picture-mount brings the opening $x$ in it at the openings $x'\,x'$ in the front $a\,a$. As shown, the eyes E of the observer come just back of the front $a\,a$ and at the openings $x'$, $x'$, and $x$, through which they receive from the mirrors $m\,n$ the reflected image of the pictures at $p$ and $p$, one of the mirrors reflecting the upper picture to one eye, the other mirror reflecting the lower picture to the other eye.

The mirrors $m\,n$ are mounted on the block B, which is attached to the picture rest or front $a\,a$ by four small rods, $r\,r\,r\,r$—one connecting each corner, respectively, of the block B and picture-rest.

H is a handle, by which the observer can hold the instrument with one hand while he moves the picture with the other.

By having the sides $p\,p$ connected across the opening $x$, Fig. 6, by a few narrow pieces, $s\,s$, the middle grooves, $c'\,c'$, might be dispensed with, and only the two outer grooves, $c\,c$, be used. The pieces *s s* would hold the parts *p p* against the front *a a*, and would not materially interfere with seeing the pictures.

The mirrors *m n* are placed edge to edge, one in front of each eye of the observer, with their reflecting surfaces differently inclined to a horizontal plane, but perpendicular to a vertical plane situated midway between the eyes of the observer and extending in front of him between the mirrors. The differently-inclined mirror-planes intersect each other, and also the horizontal plane in which lie the eyes of the observer, in one and the same sight-line, and the portion of each mirror both above and below this horizontal plane subtends vertically equal visual angles. The intersecting line of the mirror-planes is parallel to and at an equal distance from a central horizontal line taken in either of the two pictures. The inclination of the pictures to each other and to the above-mentioned horizontal plane is such that a line perpendicular to the surface of either picture at any point in its central horizontal line would, if produced, cut the line where the mirror-planes intersect. The inclination of either mirror to the horizontal plane is just half that of the picture which it reflects.

My improvement consists in the manner of constructing, arranging, and connecting the various parts, which give the following meritorious results: First, the pictures being one just above the eye, the other just below it, both are equally inclined each to its respective mirror, and the mirrors are equally inclined each to its respective eye of the observer, and this position makes the angle between the incident and reflected rays from the pictures quite small, thereby preventing much loss of light or any visible reflection or secondary image from the unsilvered surface of the mirrors; second, by the method of connecting the mirrors and picture-rest the rather delicate relations existing between the mirrors and pictures are secured in a simple and substantial manner; third, the pictures are conveniently lighted; fourth, pictures of any and different widths may be shown; fifth, a convenient, compact, and pleasing form for the instrument is secured, insuring practicability and durability.

I claim as new and desire to secure by Letters Patent—

1. The combination, in a stereoscope, of the mirrors *m* and *n*, picture rest *a a*, and the picture-mount *p p o o*, having the narrow opening *x*, and having one picture of the stereoscopic pair above the opening and the other below it, substantially as shown, and for the purpose described.

2. The combination, in a stereoscope, of the front *a a*, having two or more grooves, *c c*, hood or eye shade A, and eye-glasses L, substantially as shown and described.

3. The combination and arrangement of the mirrors *m n*, block B, rods *r r r r*, picture-rest *a a*, having two or more grooves, *c c*, and openings *x' x'*, and eye-glasses L, substantially as shown and set forth.

4. The picture-mount *p p o o*, having the right and the left pictures of the stereoscopic pair printed or otherwise mounted thereon one above the other, as indicated by the open lines *e e*, and having between these pictures the narrow central opening, *x*, substantially as shown and set forth.

AARON K. TUTTLE.

Witnesses:
G. W. LENON,
N. B. INGERSON.